(12) United States Patent
Kitagawa

(10) Patent No.: US 9,079,332 B2
(45) Date of Patent: Jul. 14, 2015

(54) METHOD FOR RESUMING OPERATION OF WIRE SAW AND WIRE SAW

(75) Inventor: Koji Kitagawa, Nishishirakawa (JP)

(73) Assignee: SHIN-ETSU HANDOTAI CO., LTD., Tokyo (JP)

(*) Notice: Subject to any disclaimer, the term of this patent is extended or adjusted under 35 U.S.C. 154(b) by 154 days.

(21) Appl. No.: 14/004,791

(22) PCT Filed: Apr. 2, 2012

(86) PCT No.: PCT/JP2012/002276
§ 371 (c)(1),
(2), (4) Date: Sep. 12, 2013

(87) PCT Pub. No.: WO2012/144136
PCT Pub. Date: Oct. 26, 2012

(65) Prior Publication Data
US 2014/0000580 A1 Jan. 2, 2014

(30) Foreign Application Priority Data

Apr. 20, 2011 (JP) ................................. 2011-094357

(51) Int. Cl.
*B28D 5/04* (2006.01)
*B23D 59/00* (2006.01)

(52) U.S. Cl.
CPC .............. *B28D 5/045* (2013.01); *B23D 59/001* (2013.01)

(58) Field of Classification Search
CPC ............ B28D 5/045; B28D 5/04; B28D 1/06; B28D 1/08; B24B 55/02; B24B 57/00
USPC ........................ 125/16.02, 16.01, 21; 451/168
See application file for complete search history.

(56) References Cited

U.S. PATENT DOCUMENTS

| 5,699,782 | A | * | 12/1997 | Toyama | ........................ 125/21 |
| 6,065,461 | A | * | 5/2000 | Asakawa et al. | ........... 125/16.02 |
| 8,567,384 | B2 | * | 10/2013 | Oishi et al. | ....................... 125/21 |

(Continued)

FOREIGN PATENT DOCUMENTS

| JP | 10-006202 A | 1/1998 |
| JP | 10-202497 A | 8/1998 |

(Continued)

OTHER PUBLICATIONS

International Search Report issued in Application No. PCT/JP2012/002276; Dated May 15, 2012.

*Primary Examiner* — Robert Rose
(74) *Attorney, Agent, or Firm* — Oliff PLC

(57) ABSTRACT

The present invention provides a method of resuming operation of a wire saw in which slicing of a workpiece is suspended and then resumed, including slicing the workpiece while detecting a traveling direction and a traveling speed of the reciprocating wire and recording them chronologically; and resuming the slicing while controlling the traveling direction and a traveling time in the traveling direction of the wire on a basis of a wire traveling history recorded until the suspending of the slicing of the workpiece such that the reciprocating cycle of the wire becomes continuous between before the suspending and after the resuming of the slicing of the workpiece. This method enables the slicing to be completed while the nanotopography of the sliced wafer is surely prevented from degrading, even when the slicing of the workpiece with a wire saw is suspended due to, for example, breaking of the wire.

4 Claims, 4 Drawing Sheets

(56) References Cited

U.S. PATENT DOCUMENTS

| | | | |
|---|---|---|---|
| 8,881,716 B2* | 11/2014 | Hoshiyama et al. | 125/16.02 |
| 2010/0037881 A1* | 2/2010 | Oishi et al. | 125/21 |
| 2010/0163010 A1* | 7/2010 | Kitagawa | 125/21 |
| 2011/0088678 A1* | 4/2011 | Kitagawa | 125/16.01 |
| 2013/0333682 A1* | 12/2013 | Blank | 125/16.02 |

FOREIGN PATENT DOCUMENTS

| | | |
|---|---|---|
| JP | 2009-090377 A | 4/2009 |
| JP | 2010-029955 A | 2/2010 |

\* cited by examiner (A)

(B)

ical field

The present invention relates to a wire saw that slices a workpiece such as a semiconductor ingot by pressing the workpiece against a wire while supplying a slurry to the wire, and particularly to a method for resuming operation of a wire saw when slicing is suspended and the wire saw.

BACKGROUND ART

Conventionally, a wire saw has been known as a means for slicing a workpiece such as a semiconductor ingot into wafers. The wire saw has a wire row formed by winding a wire for slicing around a plurality of grooved rollers multiple times, and slices a workpiece simultaneously at each wire position by causing the wire for slicing to travel in the direction of a wire axis at a high speed and feeding the workpiece with respect to the wire row while supplying a slurry properly.

Incidentally, the wire saw uses a wire composed of a material with high abrasion resistance, high tension resistance, and high hardness such as a piano wire and a grooved roller composed of a resin with a prescribed hardness, which prevents damage of the wire. Unfortunately, wear or fatigue of the wire over time may cause breaking of the wire during slicing of a workpiece, making it impossible to continue slicing of the workpiece.

In such a case, the following operations are usually preformed: disengaging operation that disengages the wire from a cut portion of the workpiece; unreeling operation that unreels the wire manually or unreels breaking portions of the wire to the outside of one grooved roller appropriately by manually operating a grooved roller drive to connect the breaking portions and then unreels the connected portion of the wire again to a position in which the connection is not directly involved in the slicing of the workpiece; replacing operation that replaces the wire with a new one, if the wire is unusable.

After such wire maintenance, return operation is performed such that each wire in the wire row is engaged with a corresponding cut portion of the workpiece, and the slicing of the workpiece is resumed to complete the slicing of the workpiece, whereby restoration operation is finished.

However, except when the time required to resume slicing of the workpiece after the start of restoration of the wire is extremely short, for example, when wire maintenance can be completed only by connecting the broken wire: the breaking of the wire occurs at a position where the wire does not fit into the grooved roller, wire maintenance for a long time (e.g., an hour or more) causes cooling and contraction of the grooved rollers, which have been thermally-expanded due to frictional heat generated between the grooved roller and its bearing or between the grooved roller and the wire; consequently the pitch of the wire row becomes narrower than that during the slicing. Resuming of the slicing of the workpiece in this state arises a problem in that an uncorrectable step is undesirably generated on a cutting plane of the sliced wafer.

To address this problem, Patent Document 1 discloses a method for operating a wire saw and a wire saw that resume slicing after adjusting axial displacement of grooved rollers and the temperature of a workpiece so that the axial displacement of the grooved rollers and the temperature of the workpiece become the same as those recorded at the time of suspension of slicing of the workpiece by supplying temperature adjusting media, each having separately adjusted temperature, to the grooved rollers and the workpiece.

These method and apparatus make it possible to avoid a step, which may be caused by contraction of the grooved rollers and the workpiece, from being generated on the wafer surface, even when it takes long hours to perform wire maintenance.

CITATION LIST

Patent Literature

Patent Document 1: Japanese Unexamined Patent Application Publication (Kokai) No. 2010-29955

SUMMARY OF INVENTION

Technical Problem

A nanotopography failure, however, may be measured in the sliced wafer, even when the slicing is resumed as described above such that wire maintenance is completed in a short time of an hour or less, and contraction of the grooved rollers and workpiece exerts almost no influence.

The present invention has been made in view of the problems described above and an object thereof is to provide a method for resuming operation of a wire saw and a wire saw that can complete slicing of a workpiece while surely preventing the nanotopography of a sliced wafer from degrading, even when the slicing of the workpiece with the wire saw is suspended due to, for example, breaking of the wire.

Solution To Problem

To attain the above-described object, the present invention provides a method of resuming operation of a wire saw in which slicing of a workpiece is suspended and then resumed, the operation including processes of: imparting axial reciprocating motion having a predetermined reciprocating cycle to a wire wound around a plurality of grooved rollers; and slicing the workpiece into wafers by moving the workpiece relatively downwardly to press the workpiece against the reciprocating wire and to feed the workpiece with the workpiece cut into while supplying a slicing slurry to the wire, the method comprising the steps of: slicing the workpiece while detecting a traveling direction and a traveling speed of the reciprocating wire and recording chronologically the traveling direction and the traveling speed; and resuming the slicing while controlling the traveling direction and a traveling time in the traveling direction of the wire on a basis of a wire traveling history recorded until the suspending of the slicing of the workpiece such that the reciprocating cycle of the wire becomes continuous between before the suspending and after the resuming of the slicing of the workpiece.

With such a method, even when the slicing of the workpiece, suspended due to an abnormal condition such as breaking of a wire, is resumed, the slicing can be completed while the nanotopography of the sliced wafer can be prevented from degrading; the wafer can be prevented from being judged to be a failure in a nanotopography test.

At this time, before the slicing of the work is resumed, axial displacement of the grooved rollers and a temperature of the workpiece are preferably adjusted by supplying temperature adjusting media such that the axial displacement and the temperature of the workpiece are equal to those upon suspending the slicing of the workpiece.

In this manner, a step on a cutting plain of the wafer due to contraction of the grooved rollers and/or the workpiece can be avoided from being generated, and the nanotopography of the wafer can be more effectively suppressed from degrading.

The present invention also provides a wire saw including: a wire wound around a plurality of grooved rollers, the wire being configured to be capable of axial reciprocating motion; a slurry supplying means for supplying a slicing slurry to the wire; a workpiece feeding means configured to move relatively downwardly a workpiece being sliced into wafers to push the workpiece against the reciprocating wire and to feed the workpiece with the workpiece cut into; a wire-traveling-history recording means for detecting a traveling direction and a traveling speed of the reciprocating wire and recording chronologically the traveling direction and the traveling speed; and a control unit for controlling the traveling direction, the traveling speed and a traveling time in each traveling direction of the reciprocating wire to impart reciprocating motion having a predetermined reciprocating cycle to the wire, wherein when the slicing of the workpiece is resumed after the slicing of the workpiece is suspended, the control unit controls the traveling direction and the traveling time in the traveling direction of the reciprocating wire on a basis of a wire traveling history recorded by the wire-traveling-history recording means until the suspending of the slicing of the workpiece such that the reciprocating cycle of the wire becomes continuous between before the suspending and after the resuming of the slicing of the workpiece.

Such a wire saw is an apparatus that can complete the slicing while the nanotopography of the sliced wafer can be prevented from degrading and prevent the wafer from being judged to be a failure in a nanotopography test even when the slicing of the workpiece, suspended due to an abnormal condition such as breaking of a wire, is resumed.

The wire saw preferably further includes a temperature-adjusting-medium supplying means for controlling a temperature of temperature adjusting media separately and supplying the temperature adjusting media to the grooved rollers and the workpiece. The temperature-adjusting-medium supplying means is configured to adjust axial displacement of the grooved rollers and a temperature of the workpiece by supplying the temperature adjusting media such that the axial displacement and the temperature of the workpiece are equal to those upon suspending the slicing of the workpiece before the slicing of the work is resumed.

With such an apparatus, a step on a cutting plain of the wafer due to contraction of the grooved rollers and/or the workpiece can be avoided from being generated, and the nanotopography of the wafer can be more effectively suppressed from degrading.

Advantageous Effects of Invention

According to the present invention, in slicing of a workpiece with a wire saw, the workpiece is sliced while a traveling direction and a traveling speed of the reciprocating wire is detected and the traveling direction and the traveling speed is chronologically recorded; when the slicing of the workpiece is resumed after the slicing of the workpiece is suspended, the traveling direction and a traveling time in the traveling direction of the wire is controlled on a basis of a wire traveling history, recorded until the suspending of the slicing of the workpiece, such that the reciprocating cycle becomes continuous between before the suspending and after the resuming of the slicing of the workpiece; thereby even when the slicing of the workpiece, suspended due to an abnormal condition such as breaking of a wire that occurs during the slicing of the workpiece, is resumed, the slicing can be completed while the nanotopography of the sliced wafer can be prevented from degrading; the wafer can be prevented from being judged to be a failure in a nanotopography test.

DESCRIPTION OF EMBODIMENTS

Hereinafter, an embodiment of the present invention will be described, but the present invention is not limited thereto.

In slicing of the workpiece with a conventional wire saw, there is a problem in that resuming slicing of a workpiece after suspending the slicing due to an abnormal condition, such as breaking of a wire, produces an uncorrectable step on a cutting plane of a wafer. Against the problem, a method for resuming slicing has been known in which axial displacement of grooved rollers and the temperature of a workpiece is adjusted so as to be equal to those upon suspending the slicing of the workpiece by controlling the temperature of temperature adjusting media separately and supplying the temperature adjusting media to the grooved rollers and the workpiece.

Such a method can avoid generation of a step, caused by contraction of the grooved rollers and the workpiece, on the cutting plane of the wafer, eliminating most of the influence of contraction of the grooved rollers and the workpiece, even when wire maintenance takes a long time. Even when such processing is performed, however, a nanotopography failure is sometimes measured in the sliced wafer.

The present inventor studied the cause of the occurrence of the above failure and found out the following:

Slicing with a wire saw using free-abrasive grains, which slices a workpiece while supplying a slurry, produces a tapered shape in a thickness profile of the sliced wafer: a shape in which the thickness increases from the side on which the wire enters the workpiece to the side on which the wire comes out of the workpiece. The thickness profile has regular pattern of steps in which the direction of the tapered shape in a sliced portion where the wire moves forward is reverse to that in a sliced portion where the wire moves backward.

Figure 3:
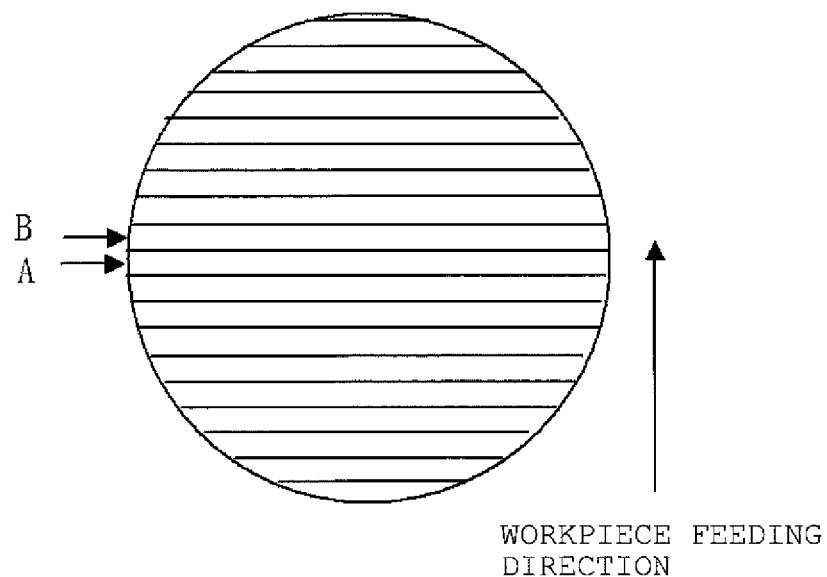
FIG. 3(A) is a side view of a cutting plane of a wafer to show a situation where a thickness profile of a wafer is minutely varied depending on the direction of the reciprocating wire.
FIG. 3(B) is the relationship between a wafer position and the thickness of a sliced portion at the wafer position.
Figure 3:
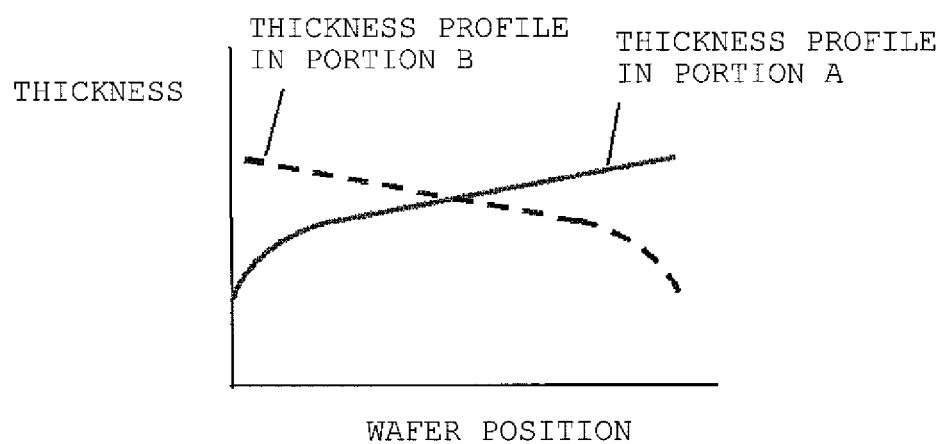

FIG. 3(A) and FIG. 3(B) are diagrams schematically depicting this state. FIG. 3(A) is a side view of a section of the workpiece and depicts a case in which the direction in which the wire is running in slicing of an A portion is reversed in slicing of a B portion. FIG. 3(B) is a diagram depicting the relationship between a wafer position from the wire entrance side in slicing of the A portion in this case and the thickness of a sliced portion. As depicted in FIG. 3(B), the thickness shapes of the A portion and the B portion are shapes in which the above-described tapered shape is reversed.

Such a regular step shape on the wafer section is minute, and, when slicing is continuously performed, it is not judged to be a failure in a nanotopography test.

However, it has been found out that, when the wire stopped at the point where forward movement of the wire had just finished and slicing is resumed from the point where forward movement of the wire is started, a portion in which slicing is resumed after suspending is sliced in a state in which the wire is traveling forward twice as far as a regular distance; thereby the pitch of a step shape becomes wider than areas in front of and behind the portion, nanotopography is degraded, and, in a nanotopography test of a sliced wafer, the wafer is judged to be a failure. The same problem also arises when slicing is suspended in the middle of a wire traveling cycle.

Then, the inventor studied repeatedly and conceived the following: slicing is resumed while a traveling direction and a traveling time in the traveling direction of a wire is controlled such that a reciprocating cycle of the wire becomes continuous between before the suspending and after the resuming of the slicing of the workpiece; thereby the slicing can be completed while the nanotopography, caused as described above, can be prevented from degrading; consequently the wafer can be prevented from being judged to be a failure in a nanotopography test. The inventor thus completed the present invention.

Figure 1:
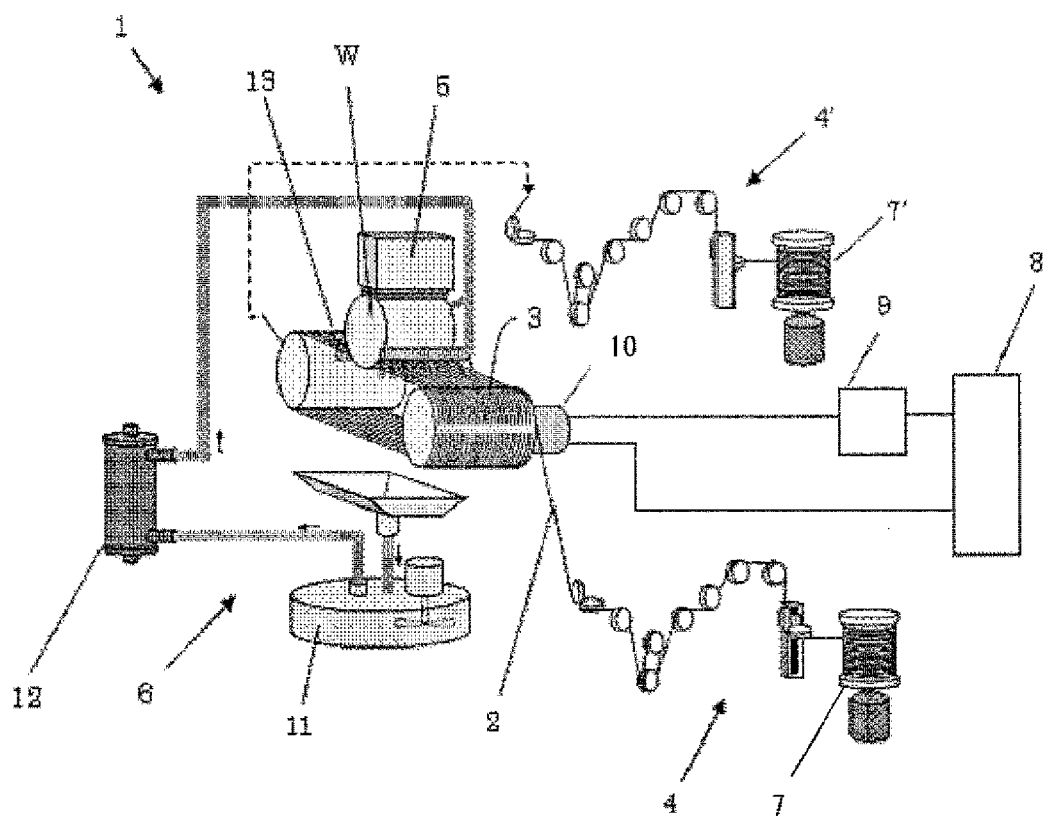
FIG. 1 is a schematic diagram depicting an example of a wire saw of the present invention.

FIG. 1 is a schematic diagram depicting an example of a wire saw of the present invention.

As depicted in FIG. 1, a wire saw 1 of the present invention is mainly constituted of a wire 2 for slicing a workpiece W, grooved rollers 3, wire tension applying mechanisms 4 and 4' for applying tension to the wire 2, a workpiece feeding means 5 that feeds the workpiece W to be sliced into wafers with the workpiece cut into by moving the workpiece W relatively downwardly, a slurry supplying means 6 for supplying a slicing slurry to the wire 2 at the time of slicing.

The wire 2 is reeled out from one wire reel 7 and enters the grooved rollers 3 through a traverser after passing through the wire tension applying mechanism 4 formed of a powder clutch (a constant torque motor), a dancer roller (a deadweight), and so forth. The wire 2 is wound around a plurality of grooved rollers 3 about 300 to 400 times, whereby a wire row are formed. The wire 2 is rolled up around a wire reel 7' after passing through the other wire tension applying mechanism 4'.

Moreover, the grooved rollers 3 are rollers, each being formed by press-fitting polyurethane resin around a steel cylinder and then cutting grooves on the surface thereof at regular intervals. With a drive motor 10, the grooved rollers 3 allow reciprocating motion in the direction of a wire axis to be imparted to the wound wire 2.

The workpiece W is bonded to a pad plate and held by the workpiece feeding means 5 via the pad plate and a workpiece plate that holds the pad plate.

When the workpiece W is sliced, the workpiece W is fed toward the wire 2, located relatively below the workpiece, by the workpiece feeding means 5. The workpiece feeding means 5 presses the workpiece W against the reciprocating wire 2 and feeds the workpiece W with the workpiece cut into by moving the workpiece W relatively downwardly until the wire 2 reaches the pad plate. The workpiece feeding means 5 can feed the workpiece W held thereby at a programmed feeding speed under computer control. Then, after completing the slicing of the workpiece W, the workpiece feeding means 5 pulls the sliced workpiece W from the wire row by reversing the direction in which the workpiece W is fed.

The slurry supplying means 6 is formed of a slurry tank 11, a slurry chiller 12, a nozzle 13, and so forth. The nozzle 13 is disposed above the wire 2 wound around the grooved rollers 3. The nozzle 13 is connected to the slurry tank 11 via the slurry chiller 12, and the slicing slurry to be supplied can be supplied to the wire 2 out of the nozzle 13 after the supply temperature of the slicing slurry is controlled by the slurry chiller 12.

Here, the type of the slurry used in slicing is not limited to a particular type, and slurry similar to existing slurry can be used; for example, slurry obtained by dispersing GC (silicon carbide) abrasive grain in liquid can be used.

Moreover, as depicted in FIG. 1, the wire saw 1 of the present invention is provided with a wire-traveling-history recording means 9 that detects a traveling direction and a traveling speed of the reciprocating wire 2 and records chronologically the traveling direction and the traveling speed during slicing of the workpiece W, and a control unit 8 that controls the traveling direction, the traveling speed, and a traveling time in each traveling direction of the reciprocating wire 2 to impart reciprocating motion having a predetermined reciprocating cycle to the wire 2.

The wire-traveling-history recording means 9 is connected to the control unit 8, and the control unit 8 can read the traveling history of the wire 2 (i.e., the traveling direction, the traveling speed, and the like that are recorded chronologically), recorded in the wire-traveling-history recording means 9.

The wire saw 1 slices the workpiece W while recording chronologically the traveling direction and the traveling speed of the reciprocating wire 2 in the wire-traveling-history recording means 9 during slicing of the workpiece W. When the slicing of the workpiece W is resumed after the slicing of the workpiece W is suspended due to the occurrence of an abnormal condition such as breaking of a wire, the control unit 8 controls the traveling direction and the traveling time in the traveling direction of the reciprocating wire 2 on the basis of the wire traveling history, recorded by the wire-traveling-history recording means 9 until the suspending of the slicing of the workpiece, in such a way that the reciprocating cycle of the wire 2 becomes continuous between before the suspending and after the resuming of the slicing of the workpiece.

At this time, the control can be implemented such that the reciprocating cycle becomes continuous with the reciprocating cycle just before the suspension of the slicing. Here, "the reciprocating cycle just before the suspension of the slicing" means a reciprocating cycle in which a predetermined forward movement and a predetermined backward movement of the wire have been completed without suspending the traveling of the wire, and the phrase "the control is implemented such that the reciprocating cycle becomes continuous" means that in a reciprocating cycle resumed after the slicing of the workpiece W is suspended during the reciprocating cycle, both the traveling time in the direction of forward movement of the wire and the traveling time in the direction of backward movement of the wire are equal to those in the reciprocating cycle just before the suspension of the slicing.

For example, when the wire has stopped at a point where traveling of the forward movement had just finished, the wire is started to travel from a starting point of the backward movement.

Furthermore, when the wire has stopped during traveling of the forward movement at a point where the wire has traveled up to for half of a predetermined time, the wire may be caused to travel after the resuming in such a manner that the wire travels in the forward direction for remaining half of the predetermined time, and then travels in the backward direction.

Such a wire saw can avoid a discontinuous profile of steps on the cutting plane of the workpiece between before the suspension of the slicing and after the resumption of the slicing, even when resuming the slicing of the workpiece suspended due to an abnormal condition such as breaking of the wire, enabling the slicing of the workpiece to be completed while suppressing degradation of nanotopography of the sliced wafer; consequently the wafer can be prevented from being judged to be a failure in a nanotopography test.

Figure 2:
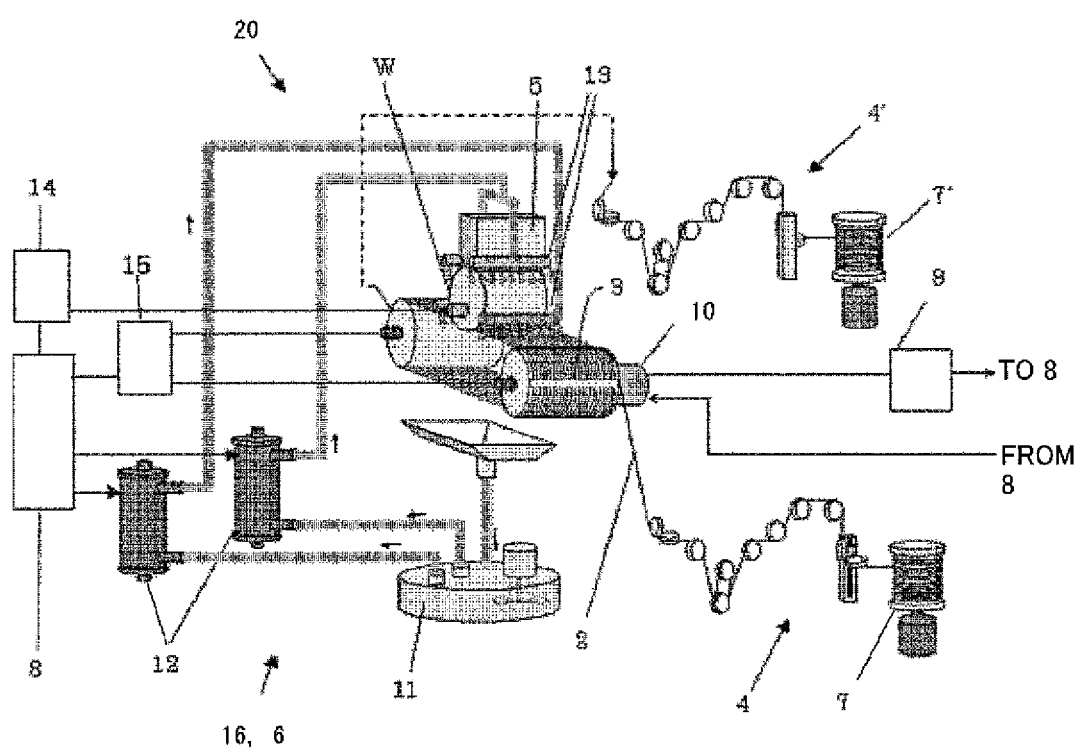
FIG. 2 is a schematic diagram depicting another example of the wire saw of the present invention.

At this time, it is preferable to adopt a configuration in which, as depicted in FIG. 2, a temperature adjusting medium supplying means 16 that supplies independently temperature-controlled temperature adjusting media to the grooved rollers 3 and the workpiece W is further provided and the axial displacement of the grooved rollers 3 and the temperature of the workpiece W are adjusted so that the axial displacement of the grooved rollers 3 and the temperature of the workpiece W become the same as those recorded at the time of suspension of slicing of the workpiece by supplying the temperature adjusting media by the temperature adjusting medium supplying means 16 before the slicing of the workpiece is resumed.

A wire saw 20 depicted in FIG. 2 includes a workpiece-temperature recording means 14 with a radiating type thermometer or the like for measuring and recording the temperature of the workpiece W which is being sliced and a displacement recording means 15 with an eddy current displacement sensor or the like for measuring and recording the amount of axial displacement of the grooved rollers 3. With these recording means 14 and 15, it is possible to record the amount of axial displacement of the grooved rollers 3 and the temperature of the workpiece W when slicing of the workpiece is suspended.

Such a configuration can avoid a discontinuous state of thermal expansion of the grooved rollers and the workpiece between before the suspension of the slicing and after the resumption of the slicing, enabling the slicing of the workpiece to be completed while suppressing the generation of a step on the surface of the sliced wafer and the degradation of nanotopography.

Such an adjustment of the axial displacement of the grooved rollers and the temperature of the workpiece can be controlled by the above-described control unit 8 that controls the traveling direction, the traveling speed, and the traveling time in each traveling direction of the reciprocating wire as depicted in FIG. 2, or another control unit provided separately from the control unit 8.

Here, as depicted in FIG. 2, as the temperature adjusting media that are supplied to the grooved rollers 3 and the workpiece W, the slurry that is used when the workpiece W is sliced can be used. Doing so eliminates the need to prepare an extra temperature adjusting medium, making it possible to simplify an apparatus configuration and resume slicing of the workpiece W promptly without stopping the supply of the slurry after the amount of axial displacement of the grooved rollers and the temperature of the workpiece are adjusted. FIG. 2 depicts an example in which the same slurry tank 11 and slurry chiller 12 as those of the slurry supplying means 6 are used to carry out the supply of the temperature adjusting medium to the grooved rollers 3 performed by the temperature adjusting medium supplying means 16.

Alternatively, as the temperature adjusting medium to the workpiece W, temperature-controlled gas can also be used.

Next, a method of the present invention for resuming operation of a wire saw will be described.

Here, a case in which the wire saw of the present invention depicted in FIG. 1 is used will be described.

The description is based on the assumption that, to perform slicing of the workpiece W, the pad plate is first bonded to the workpiece W and the pad plate is held by the workpiece plate. Then, the workpiece W is held by the workpiece feeding means 5 via the pad plate and the workpiece plate.

Next, the wire 2 is cause to reciprocate in its axial direction with tension applied to the wire. The workpiece W held by the workpiece feeding means 5 is pressed against the reciprocating wire 2 and fed with the workpiece cut into by moving the workpiece W relatively downwardly while a slicing slurry is supplied to the wire 2, so that the workpiece W is sliced.

Moreover, the traveling direction and the traveling speed of the reciprocating wire 2 are detected and recorded chronologically in the wire-traveling-history recording means 9 during the slicing of the workpiece W.

When the slicing is resumed after the slicing of the workpiece is suspended due to the occurrence of an abnormal condition such as breaking of the wire, first the cause of the suspending of the slicing is removed and restoration operation is performed. For example, when breaking of the wire 2 has occurred, the wire 2 is repaired, and then restoration operation is performed in which each wire in the wire row is engaged with a corresponding cut portion of the workpiece.

When the slicing of the workpiece is resumed after the slicing of the workpiece is suspended, the traveling direction and the traveling time in the traveling direction of the reciprocating wire is controlled by the control unit 8 on the basis of the wire traveling history, recorded until the suspending of the slicing of the workpiece such that the reciprocating cycle of the wire becomes continuous between before the suspending and after the resuming of the slicing of the workpiece.

At this time, the control can be implemented such that the reciprocating cycle becomes continuous with the reciprocating cycle just before the suspension of the slicing. Here, "the reciprocating cycle just before the suspension of the slicing" means a reciprocating cycle in which a predetermined forward movement and a predetermined backward movement of the wire have been completed without suspending the traveling of the wire, and the phrase "the control is implemented such that the reciprocating cycle becomes continuous" means that in a reciprocating cycle resumed after the slicing of the workpiece W is suspended during the reciprocating cycle, both the traveling time in the direction of forward movement of the wire and the traveling time in the direction of backward movement of the wire are equal to those in the reciprocating cycle just before the suspension of the slicing.

For example, when the wire has stopped at a point where traveling of the forward movement had just finished, the wire is started to travel from a starting point of the backward movement.

Furthermore, when the wire has stopped during traveling of the forward movement at a point where the wire has traveled up to for half of a predetermined time, the wire may be caused to travel after the resuming in such a manner that the wire travels in the forward direction for remaining half of the predetermined time, and then travels in the backward direction.

Such a method can avoid a discontinuous profile of steps on the cutting plane of the workpiece between before the suspension of the slicing and after the resumption of the slicing, even when resuming the slicing of the workpiece suspended due to an abnormal condition such as breaking of the wire, enabling the slicing of the workpiece to be completed while suppressing the degradation of nanotopography of the sliced wafer; consequently the wafer can be prevented from being judged to be a failure in a nanotopography test.

Incidentally, when slicing is suspended due to an abnormal condition of some kind during slicing of the workpiece, stopping the traveling of the wire instantly at occurrence of the abnormal condition may exert an excessive force on the wire, resulting in breaking of the wire at an position different from that of the abnormal condition. To prevent such breaking of the wire caused by stopping the wire, the wire is stopped by decelerating the wire at a constant acceleration, as in the case of reversing the traveling direction of the wire. Also in such a case, as described above, a discontinuous profile of steps on the cutting plane of the workpiece between before the suspension of the slicing and after the resumption of the slicing can be surely avoided by controlling the traveling direction and the traveling time in the traveling direction of the reciprocating wire on the basis of the wire traveling history, recorded until the suspending of the slicing of the workpiece, in such a way that the reciprocating cycle of the wire becomes continuous between before the suspending and after the resuming of the slicing of the workpiece.

At this time, before the slicing of the work is resumed, the axial displacement of the grooved rollers and the temperature of the workpiece are preferably adjusted by supplying temperature adjusting media such that the axial displacement and the temperature of the workpiece are equal to those upon suspending the slicing of the workpiece.

Such a method can avoid a discontinuous state of thermal expansion of the grooved rollers and the workpiece between before the suspension of the slicing and after the resumption of the slicing, enabling the slicing of the workpiece to be completed while suppressing the generation of a step on the surface of the sliced wafer and the degradation of nanotopography.

EXAMPLE

Hereinafter, the present invention will be described more specifically with reference to examples and comparative examples of the present invention, but the present invention is not limited to these examples.

Examples 1-3

Slicing of a 300-mm-diameter silicon ingot into wafers was started with the wire saw of the present invention depicted in FIG. 1, suspended halfway, and resumed in accordance with the method of resuming operation of the present invention. Then, the nanotopography of the sliced wafer was evaluated. The nanotopography evaluated here was the maximum value in a 10 mm×10 mm area measured in a region near a position at which the slicing was suspended.

Figure 4:
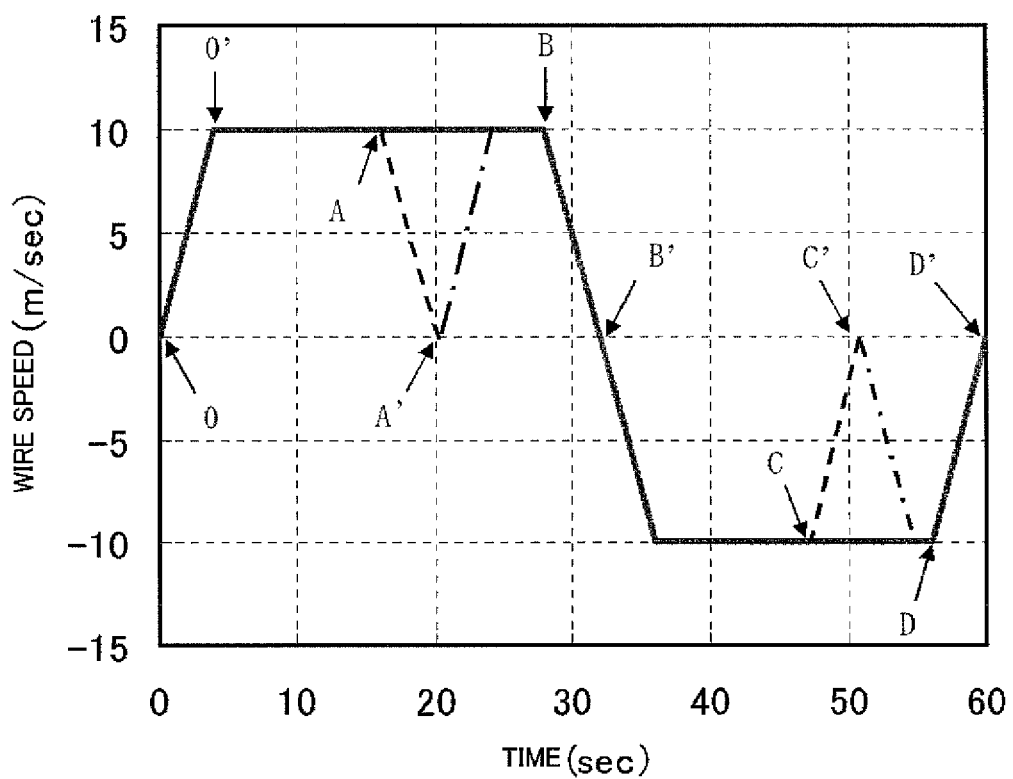
FIG. 4 is a diagram depicting a profile of a wire traveling speed in Examples 1 to 3 and Comparative Examples 1 to 3.

During the slicing of the workpiece, the wire was caused to travel in accordance with a traveling speed profile depicted in FIG. 4. This traveling speed profile has a reciprocating cycle in which the wire is started to travel in the direction of forward movement from a point denoted by "0", decelerated at a constant acceleration from a point denoted by "B", started to travel in the direction of backward movement from a point denoted by "B".

First, the silicon ingot was sliced up to a middle position (a cutting depth of 150 mm) while the traveling direction and the traveling speed of the reciprocating wire was detected and recorded. At the middle position, the slicing was suspended, and the silicon ingot was raised to be extracted from the wire row. Then, the silicon ingot was moved downwardly again and returned to the position at which the slicing was suspended to resume the slicing. Here, suspending timings of the slicing was set at points of A, B, and C in the traveling speed profile depicted in FIG. 4, and the wire was finally stopped at points A', B', and C' in the reciprocating cycle.

Then, the slicing was resumed from the following point: point A' (Example 1); point B' (Example 2); and point C' (Example 3) in the reciprocating cycle. That is, the slicing was resumed while the reciprocating cycle of the wire was controlled to be continuous between before the suspending and after the resuming of the slicing of the workpiece: the reciprocating cycle of the wire was controlled to be equal to the reciprocating cycle just before the wire stopped by suspending the slicing of the workpiece, that is, the traveling time of the wire in the forward direction and backward direction was to be equal to the traveling time just before the wire stopped.

The results are listed in Table 1. As listed in Table 1, all of Examples 1 to 3 exhibit improved nanotopography as compared to the later-described Comparative Examples 1 to 3. Moreover, a nanotopography test revealed that a failure was not detected in any of the wafers of Examples 1 to 3.

As described above, it was confirmed that the wire saw and the method of resuming operation of a wire saw of the invention enables slicing to be completed while preventing the nanotopography of the sliced wafer from degrading, and the wafer to be prevented from being judged to be a failure in a nanotopography test, even when the slicing of the workpiece is resumed.

Comparative Examples 1-3

With an conventional wire saw having no control unit in accordance with the present invention, a silicon ingot was sliced and the nanotopography of the sliced wafer was evaluated under the same conditions as those of Examples 1 to 3 except that suspending timings of the slicing was set at points of A (Comparative Example 1), B (Comparative Example 2), and C (Comparative Example 3) in the traveling speed profile depicted in FIG. 4, and the slicing was resumed at the point "0", which was irrelevant to the position of suspending the slicing, that is, the traveling direction and the traveling time in the traveling direction of the reciprocating wire was not controlled upon suspending the slicing of the workpiece.

The results are listed in Table 1. As listed in Table 1, all of Comparative Examples 1 to 3 exhibit worse nanotopography as compared to Examples 1 to 3. Moreover, a nanotopography test revealed that a failure was detected in any of the wafers of Comparative Examples 1 to 3.

TABLE 1

| | Suspension of slicing | Resumption of slicing | Nanotopography (nm) |
|---|---|---|---|
| Example 1 | A | A' | 13.9 |
| Example 2 | B | B' | 13.7 |
| Example 3 | C | C' | 14 |
| Comparative Example 1 | A | 0 | 18.3 |
| Comparative Example 2 | B | 0 | 20.5 |
| Comparative Example 3 | C | 0 | 16.8 |

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method of resuming operation of a wire saw in which slicing of a workpiece is suspended and then resumed, the operation including processes of: imparting axial reciprocating motion having a predetermined reciprocating cycle to a wire wound around a plurality of grooved rollers; and slicing the workpiece into wafers by moving the workpiece relatively downwardly to press the workpiece against the reciprocating wire and to feed the workpiece with the workpiece cut into while supplying a slicing slurry to the wire, the method comprising the steps of:

slicing the workpiece while detecting a traveling direction and a traveling speed of the reciprocating wire and recording chronologically the traveling direction and the traveling speed; and resuming the slicing while controlling the traveling direction and a traveling time in the traveling direction of the wire on a basis of a wire traveling history recorded until the suspending of the slicing of the workpiece such that the reciprocating cycle of the wire becomes continuous between before the suspending and after the resuming of the slicing of the workpiece.

2. The method of resuming operation of a wire saw according to claim 1, wherein before the slicing of the work is resumed, axial displacement of the grooved rollers and a temperature of the workpiece are adjusted by supplying temperature adjusting media such that the axial displacement and the temperature of the workpiece are equal to those upon suspending the slicing of the workpiece.

3. A wire saw comprising:

a wire wound around a plurality of grooved rollers, the wire being configured to be capable of axial reciprocating motion;

a slurry supplying means for supplying a slicing slurry to the wire;

a workpiece feeding means configured to move relatively downwardly a workpiece being sliced into wafers to push the workpiece against the reciprocating wire and to feed the workpiece with the workpiece cut into;

a wire-traveling-history recording means for detecting a traveling direction and a traveling speed of the reciprocating wire and recording chronologically the traveling direction and the traveling speed; and a control unit for controlling the traveling direction, the traveling speed and a traveling time in each traveling direction of the reciprocating wire to impart reciprocating motion having a predetermined reciprocating cycle to the wire, wherein when the slicing of the workpiece is resumed after the slicing of the workpiece is suspended, the control unit controls the traveling direction and the traveling time in the traveling direction of the reciprocating wire on a basis of a wire traveling history recorded by the wire-traveling-history recording means until the suspending of the slicing of the workpiece such that the reciprocating cycle of the wire becomes continuous between before the suspending and after the resuming of the slicing of the workpiece.

4. The wire saw according to claim 3, further comprising:

a temperature-adjusting-medium supplying means for controlling a temperature of temperature adjusting media separately and supplying the temperature adjusting media to the grooved rollers and the workpiece, the temperature-adjusting-medium supplying means being configured to adjust axial displacement of the grooved rollers and a temperature of the workpiece by supplying the temperature adjusting media such that the axial displacement and the temperature of the workpiece are equal to those upon suspending the slicing of the workpiece before the slicing of the work is resumed.

\* \* \* \* \*